United States Patent [19]
Capetta et al.

[11] Patent Number: 5,893,321
[45] Date of Patent: Apr. 13, 1999

[54] APPARATUS FOR SHAPING BAKERY PRODUCTS

[75] Inventors: Daniele Capetta; Antonio Chierici; Enrico Schiaretti, all of Parma, Italy

[73] Assignee: Barilla Alimentare S.p.A., Parma, Italy

[21] Appl. No.: 09/080,409

[22] Filed: May 18, 1998

[51] Int. Cl.[6] .............. A21C 3/06; A21C 11/00; A21C 1/00; A21D 6/00
[52] U.S. Cl. ............ 99/450.2; 99/353; 99/450.1; 425/92; 425/321; 425/325; 425/335
[58] Field of Search ................. 99/353, 450.1, 99/450.2, 450.3, 450.7, 450.8, 494; 425/321, 92, 322, 115, 325, 141, 329, 145, 335, 194, 391, 239, 363, 373; 426/500–503, 512, 231; 198/456, 379, 468.3; 414/783

[56] References Cited

U.S. PATENT DOCUMENTS

| | | | |
|---|---|---|---|
| 4,313,719 | 2/1982 | Lundgren | 425/335 |
| 4,441,408 | 4/1984 | Costa | 99/450.2 |
| 4,582,472 | 4/1986 | Hanson | 425/139 |
| 4,905,583 | 3/1990 | Hayashi | 425/321 X |
| 4,961,697 | 10/1990 | De Fockert et al. | 99/353 X |
| 4,996,915 | 3/1991 | Morikawa et al. | 99/450.2 |
| 5,018,439 | 5/1991 | Bordin | 99/450.7 X |
| 5,078,585 | 1/1992 | Morikawa et al. | 425/321 X |
| 5,281,120 | 1/1994 | MOrikawa et al. | 426/512 X |
| 5,440,974 | 8/1995 | Ueno et al. | 99/450.2 |
| 5,460,081 | 10/1995 | Ueno et al. | 99/450.1 X |
| 5,606,906 | 3/1997 | Finkowski et al. | 425/92 X |
| 5,609,094 | 3/1997 | Ueno et al. | 99/450.2 |

FOREIGN PATENT DOCUMENTS

| | | |
|---|---|---|
| 0 238 682 | 3/1986 | European Pat. Off. . |
| 0 213 088 | 7/1986 | European Pat. Off. . |
| 0 770 330 A1 | 10/1996 | European Pat. Off. . |
| 520213 | 2/1931 | Germany . |
| 27 09 544 A 1 | 9/1977 | Germany . |
| 44 02 346 A1 | 3/1995 | Germany . |
| 265377 | 2/1926 | United Kingdom . |
| 617910 | 5/1946 | United Kingdom . |

*Primary Examiner*—Timothy F. Simone
*Attorney, Agent, or Firm*—Sixbey, Friedman Leedom & Ferguson; Frank P. Presta; Joseph S. Presta

[57] ABSTRACT

An apparatus (10) for rolling sheets (S) of dough for bakery products (P) has a simplified structure and optimum efficiency and comprises a pair of shaping rollers (17, 19), arranged transversely with respect to the direction of forward movement (A) of the dough sheets (S), with axes of rotation (R1, R2) essentially parallel to the surface (12) on which the dough sheets (S) are conveyed and defining a first shaping surface (18), located at a short distance from the conveying surface (12), in such a way as to lift the dough sheet (S), and a second shaping surface (20) approximately tangential to the first surface (18), the second shaping roller (19) being located in such a way as to define a rolling space (21) whose transverse dimensions are roughly comparable to those of the shaped bakery product (P).

11 Claims, 3 Drawing Sheets

5,893,321

APPARATUS FOR SHAPING BAKERY PRODUCTS

FIELD OF THE INVENTION

The present invention relates to an apparatus for shaping bakery products and in particular for rolling sheets of dough for bakery products for the production of croissants and the like.

The term "bakery product" is hereinbelow used, for the sake of simplicity, to indicate a shaped semifinished product, which, after baking in an oven, gives rise to a final product such as a croissant or the like.

The said sheet of dough is generally laid on a conveying surface moving in a given direction of forward movement, defined for example by a conveyor belt.

BACKGROUND OF THE INVENTION

The prior art includes systems for rolling dough sheets as specified above. These involve the use of planar or curved moving surfaces defined by belts or the like. These surfaces co-operate with the conveying surface and, by friction, roll the dough sheet in the desired manner.

In the said systems particular attention must be paid to the cleaning of the said moving surfaces. For this purpose the systems are provided with special scraper means which, in a position out of the way of the shaping station proper, remove from the said belts the traces of flour or similar residues which inevitably stick to the said moving surfaces during the rolling.

It should be understood, of course, that these residues do not represent a contamination or soiling of the environment of the shaping process, being derived purely from the semifinished bakery products.

This cleaning operation is necessary for two fundamental reasons. In the first place the residues could build up and subsequently detach themselves in the vicinity of delicate mechanical components such as motors, drives and gears or even become mixed in the lubricant and make it ineffective.

Moreover, the build-up of residues impairs the surface finish of the moving surfaces that carry out the rolling action.

However, there is no doubt but that the scraper means and corresponding means for collecting and disposing of the residues constitute a major structural complication of a shaping apparatus which thus becomes a critical point in an automated bakery products manufacturing process.

SUMMARY OF THE INVENTION

The technical problem underlying the present invention is how to devise a shaping apparatus capable of overcoming the disadvantages cited with reference to the prior art.

The principle put forward as a solution in accordance with the present invention is to make use of the said residues in order to optimize the aforementioned rolling process, thereby rendering it no longer necessary to get rid of the residues.

This problem is solved by a device of the specified type that is characterized in that it comprises a first shaping roller, arranged transversely with respect to the said direction of forward movement, whose axis of rotation is essentially parallel to the conveying surface and which has a first shaping surface located at a short distance from the said conveying surface, in such a way as to intercept the advancing dough sheet, the said first roller being rotated in a direction such as to lift the dough sheet from the conveying surface, and a second roller, also arranged transversely with respect to the said direction of forward movement and with an axis of rotation essentially parallel to the conveying surface, with a second shaping surface approximately tangential to the said first shaping surface, the said second shaping roller being rotated in the same angular direction as the first shaping roller and being set away from and above the conveying surface, preceding the first shaping roller in the direction of forward movement, in such a way as to define a rolling space defined by the conveying surface and by the said first and second shaping surfaces, the said rolling space having transverse dimensions roughly comparable with those of the shaped oven good.

The chief advantage of the apparatus according to the invention is that the said shaping rollers define shaping surfaces of limited area that are continually in contact with the bakery products. The quantity of residues that sticks to these surfaces quickly reaches a situation of equilibrium which accordingly gives the said surfaces a constant coefficient of friction relative to the dough sheets that are being rolled.

In this way, rather than being eliminated, the residues assist in the shaping of the bakery product.

Furthermore, as they are not stuck to moving belts of large surface area, they remain restricted to a precise zone of the shaping station and are therefore no longer disruptive.

The shaping station is in this way extremely simplified in terms of its structure and functions more satisfactorily.

BRIEF DESCRIPTION OF THE DRAWINGS

Further features and advantages of the shaping apparatus according to the invention will be made clear in the description of a preferred embodiment thereof which is given by way of non-restrictive illustration with reference to the accompanying drawings, in which.

DETAILED DESCRIPTION OF THE INVENTION

Figure 1:
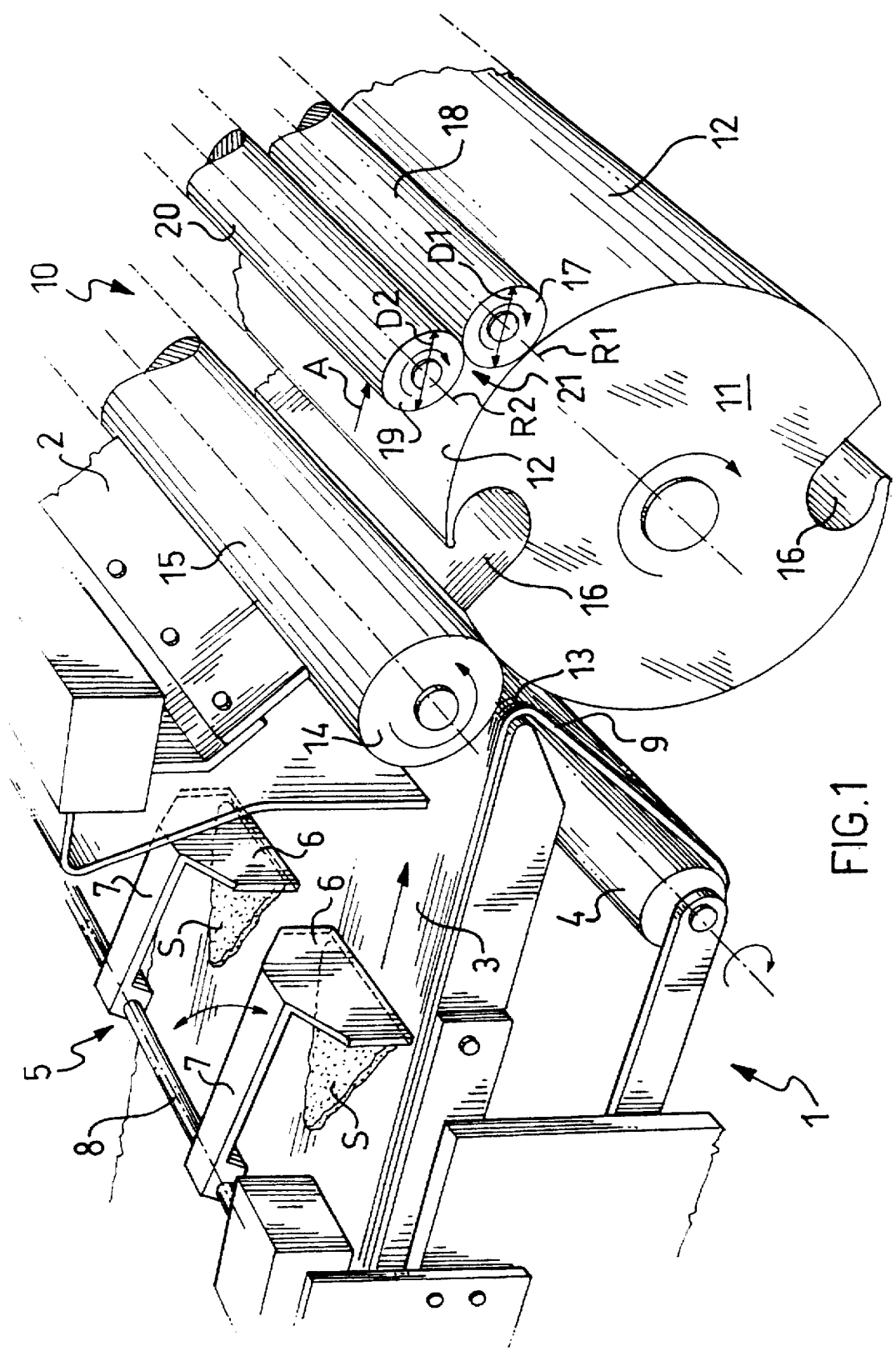
FIG. 1 is a perspective view, partly in section, of a station for shaping dough for bakery products that incorporates the dough rolling apparatus according to the invention.

In the figures a station for shaping bakery products is given the general reference 1. It is designed for the shaping of bakery products, such as for example the so-called croissant, which require the rolling up of a sheet of dough, denoted S, into a fully rolled-up finger.

The station 1 receives the dough sheets S laid out on a conveyor belt 3 that is supported by rollers 4 and receives the dough sheets S from a previous station in an automated production line for the above-described bakery products.

The shaping station 1 comprises arresting means 5 for the dough sheets lying on the belt 3. The said arresting means 5 comprise a plurality of blades 6 each supported by an arm 7 mounted on a shaft 8 running across the belt 3.

The blades 6 are moveable between a position in which they rest on the belt 3 and a position in which they are lifted off the belt 3.

In the first position, that is on the belt, the blades 6 are locked in this position and contact the surface of the belt 3 with a certain force, the belt 3 continuing to run at a constant speed. In this position the dough sheets S are each arrested by the corresponding blade 6 and are held still while the belt 3 runs underneath them.

By means of a rotation imparted to the shaft 8 the blades are all simultaneously lifted into the up position, thus allowing a row of dough sheets S to pass through.

At a terminal end 9 of the belt 3 the station 1 comprises an apparatus for rolling sheets of dough in accordance with the invention. This apparatus is given the general reference 10.

The apparatus 10 comprises a first cylinder 11 positioned adjacent to the said terminal end 9 and rotated at a substantially constant speed. The first cylinder 11 defines a conveying surface 12 that moves in a given direction of forward movement that agrees with the direction of forward movement defined by the preceding conveyor belt 3.

The speed of rotation of the first cylinder 11 defines a peripheral speed of the conveying surface 12 which may be equal to or greater than the speed of conveyance imparted by the conveyor belt 3.

The position of the first cylinder 11 with respect to the terminal end 9 is such as to introduce into the path of the dough sheets S a discontinuity 13 that is not too great.

The direction of rotation of the first cylinder 11 is such as to generate the direction of forward movement A defined earlier.

At the discontinuity 13, the apparatus 10 comprises a second cylinder 14 in substantially tangential contact both with the conveyor belt 3, at its terminal end 9, and with the first cylinder 11.

The second cylinder 14 is rotated at a roughly constant angular speed in the opposite direction to that of the first cylinder 11, in order that the dough sheets S are effectively caught between the cylinders 11, 14.

The outer surface 15 of the second cylinder 14 is subject to a peripheral speed corresponding to the angular speed of the second cylinder 14. Any differences between the peripheral velocities of the cylinders 11, 14 and between these and the speed of forward movement of the belt 3 could stretch and substantially lengthen the dough sheets S on the conveying surface 12 of the first cylinder 11.

The outer surface 15 of the second cylinder 14 is conveniently cleaned by scraper means 2.

Once past the second cylinder 14 the dough sheets S are thus deposited substantially in line with each other on the conveying surface 12.

The first cylinder 11 has a plurality of recesses 16 at equal intervals around the circumference of its conveying surface 12. The recesses 16 are constituted by respective longitudinal grooves formed in the conveying surface and generally parallel to the generatrices of the first cylinder 11.

The action of the arresting means 5 is such that an alignment of dough sheets S is deposited on the conveying surface 12 in a position immediately following a recess 16.

In the present embodiment of the apparatus 10 according to the invention, there are two recesses 16, each diametrically opposite the other.

The rolling apparatus 10 according to the invention also comprises a first straight shaping roller 17 arranged on the first cylinder 11 and running essentially transversely with respect to the direction of forward movement of the conveying surface 12.

In the present illustrative embodiment the first roller 17 possesses a first shaping surface 18 which is a cylindrical surface with a circular cross-section of given diameter D1. It also has an axis of rotation R1 that is essentially parallel to the conveying surface 12.

The first roller 17 with the first cylindrical surface 18 is in an essentially symmetrical angular position relative to the terminal end 9 of the conveyor belt 3 and is located at a short distance from the conveying surface 12 in order to intercept the dough sheet S as it moves forward on the said surface 12.

This distance is therefore at least a little less than the thickness of the dough S, which in turn is determined by the combined action of the cylinders 11, 14.

The first shaping roller 17 is rotated at an angular speed of the same direction as that of the first cylinder 11, in other words such as to lift the dough sheets S from the conveying surface 12.

The apparatus 10 for rolling dough sheets S also comprises a second roller 19 having a second straight shaping surface 20 located on the first cylinder 11 in an essentially transverse position with respect to the direction of forward movement of the conveying surface 12: it is raised above the said surface 12 and set away from the first roller 17 so as to precede the latter in the direction of forward movement A, thereby generally defining a rolling space 21 defined by the conveying surface 12 and by the said first and second shaping surfaces 18, 20.

The second roller 19 is rotated at an angular speed generally similar to that of the first roller 17 and with an angular direction the same as that of the first roller 17.

In the present illustrative example the second shaping surface 20 of the second roller 18 is a cylindrical surface with a circular cross-section of given diameter D2. It also has an axis of rotation R2 essentially parallel to the conveying surface 12.

The first and second rollers 17, 19 are in substantia contact, i.e. the second shaping surface 20 is substantially tangential to the first shaping surface 18.

In addition, in the present illustrative embodiment, the axes of rotation R1, R2 of the rollers 17, 19 are perpendicular to the said direction of forward movement A and the diameters D1 and D2 are equal.

Figure 2:
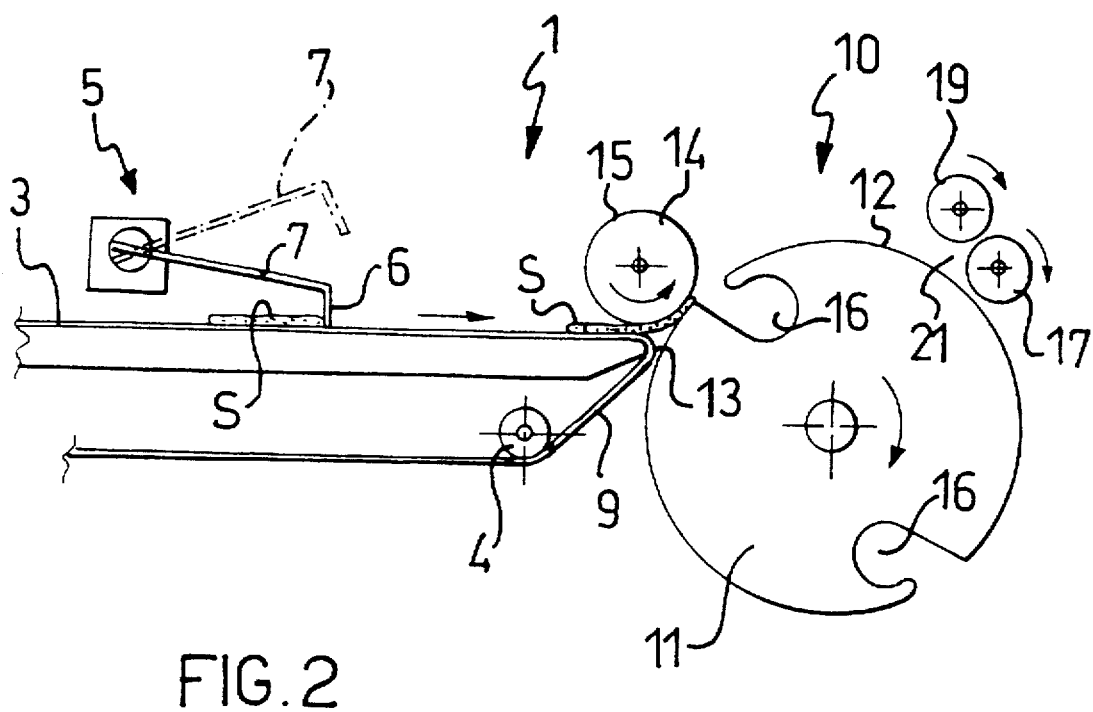
FIGS. 2 to 5 show a side view of the station shown in FIG. 1 and illustrate various phases in the operation of the rolling apparatus.
Figure 3:
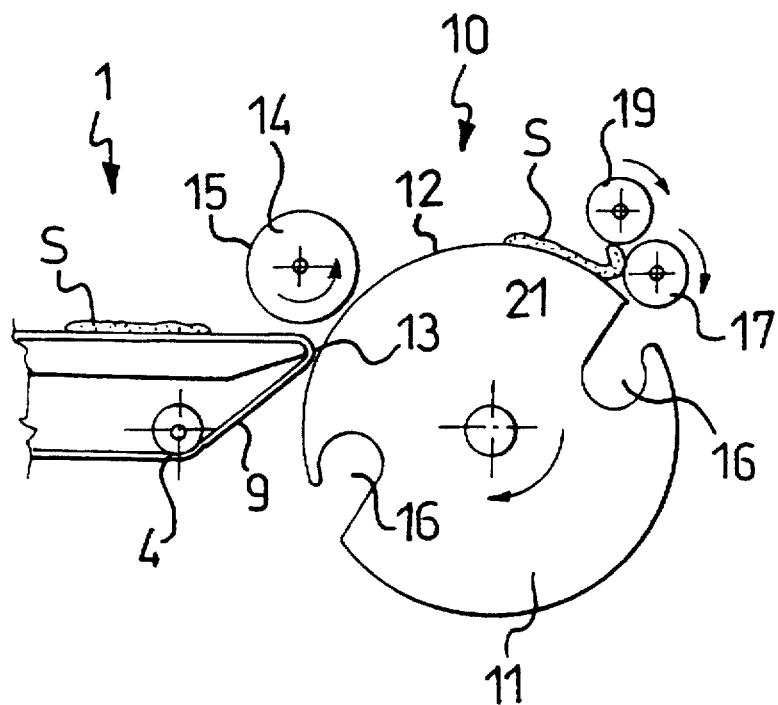
Figure 4:
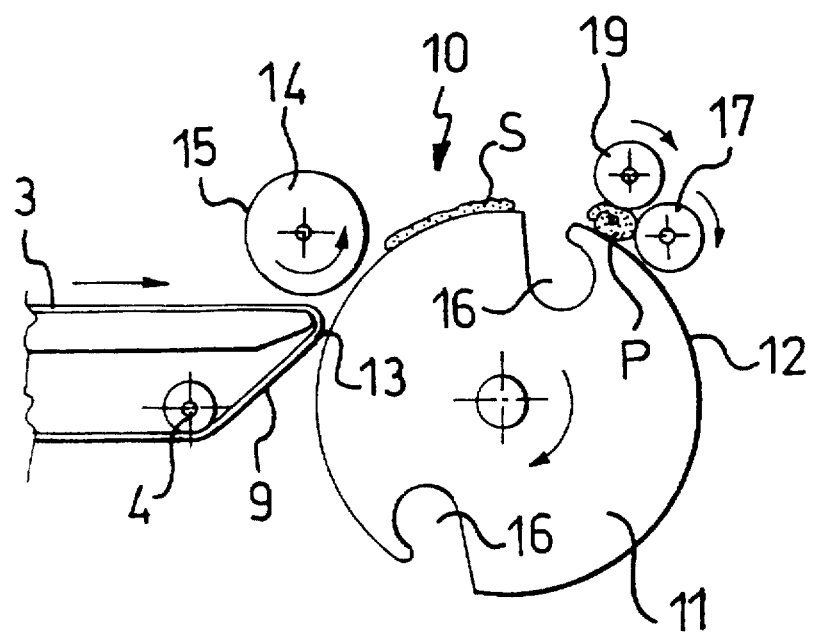

With regard to the operation of the apparatus 10 in accordance with the invention, once an alignment of dough sheets S has been deposited on the conveying surface 12 of the first cylinder 11 (FIG. 2) owing to the joint action of the arresting means 5, each individual dough sheet S reaches the first shaping roller 17, is lifted (FIG. 3) by the first surface of rotation 18, encounters the second surface of rotation 20 of the second roller 19 and, by the latter, in combination with the first roller 17 and with the conveying surface 12, the dough sheet S is made to roll up on itself (FIG. 4), while remaining effectively trapped within the space 21.

Figure 5:
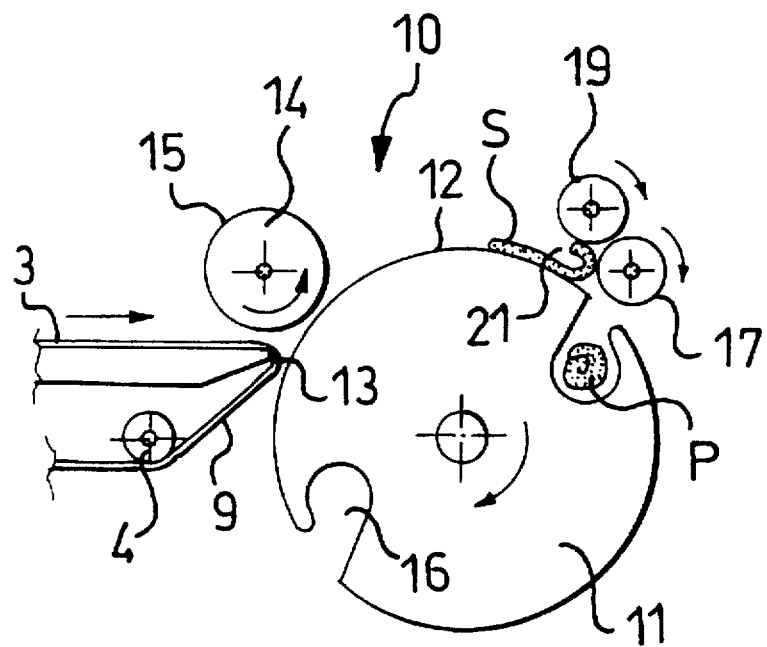

When rolling is complete, while the first cylinder 11 continues to turn, the now shaped bakery product, denoted P, is approached by a recess 16 into which it falls (FIG. 5), being no longer supported by the conveying surface.

Immediately behind the recess 16 is a new alignment of dough sheets S ready for rolling; in the meantime the newly shaped products P are carried in their recess 16 to the next station of the production line.

As rows of dough sheets S continue to be rolled up, they deposit a thin layer of floury residue on the surfaces involved 12, 18, 20; this sticks to the said surfaces 12, 18, 20 and increases the friction between them and the dough sheets S to the point where the efficiency of the rolling action is significantly improved.

Very soon the residual layer adhering to the surfaces involved 12, 18, 20 will not increase in thickness but reach a situation of equilibrium in which the rolling action is effectively optimized.

To enable even better co-operation between the conveying surface 12 and the shaping surfaces 18, 20, the rollers 17, 19 are set in positions such that the rolling space 21 has transverse dimensions roughly comparable to those of the shaped bakery product P.

Furthermore, in the present example of an embodiment of the apparatus 10 in accordance with the invention, the given diameters D1 and D2 of the rollers 17, 19 are of a magnitude roughly comparable with the transverse dimensions of the shaped baked product P.

The said diameters D1, D2 are advantageously of a magnitude of between 60% and three times the said maximum transverse dimension of the shaped bakery product P.

It will be understood that the apparatus described above can also be used for rolling bakery products that are different from each other, such as croissants of varying dimensions, cannoli, forms of bread and others.

In addition, the shaping surfaces may, like the conveying surface, be provided with incisions and projections in order to give the surface of the bakery product ornamental decorations or indentations.

In order to satisfy other particular needs, a person skilled in the art will be able to make many other modifications and alterations to the rolling apparatus described above, all however falling within the scope of protection of the present invention, as defined in the accompanying claims.

We claim:

1. An apparatus (10) for rolling sheets (S) of dough for bakery products (P), said dough sheet (S) being laid on a conveying surface (12) moving in a given direction of forward movement (A), which apparatus comprises a first shaping roller (17), arranged transversely with respect to said direction of forward movement (A), whose axis of rotation (R1) is essentially parallel to the conveying surface (12) and which has a first shaping surface (18) located at a short distance from said conveying surface (12), in such a way as to intercept the advancing dough sheet (S), said first shaping roller (17) being rotated in a direction such as to lift the dough sheet (S) from the conveying surface (12), and a second roller (19), also arranged transversely with respect to said direction of forward movement (A) and with an axis of rotation (R2) essentially parallel to the conveying surface (12), with a second shaping surface (20) approximately tangential to said first shaping surface (18), said second shaping roller (19) being rotated in the same angular direction as the first shaping roller (17) and being set away from and above the conveying surface (12), preceding the first shaping roller (17) in the direction of forward movement (A), in such a way as to define a rolling space (21) defined by the conveying surface (12) and by said first and second shaping surfaces (18, 20), said rolling space (21) having transverse dimensions roughly comparable with those of the shaped bakery product (P).

2. Apparatus (10) according to claim 1, in which the first shaping surface (18) is a cylindrical surface with a circular cross-section of given diameter (D1).

3. Apparatus (10) according to claim 2, in which the given diameter (D1) of the first shaping surface (18) is of roughly comparable magnitude to the maximum transverse dimensions of the shaped bakery product (P).

4. Apparatus (10) according to claim 3, in which the given diameter (D1) of the first shaping surface (18) is of a magnitude of between 60% and three times said maximum transverse dimension of the shaped bakery product (P).

5. Apparatus (10) according to claim 1, in which the second shaping surface (20) is a cylindrical surface with a circular cross-section of given diameter (D2).

6. Apparatus (10) according to claim 5, in which the given diameter (D2) of the second shaping surface (20) is of a magnitude roughly comparable with the maximum transverse dimensions of the shaped bakery product (P).

7. Apparatus (10) according to claim 6, in which the given diameter (D2) of the second shaping surface (20) is of a magnitude of between 60% and three times said maximum transverse dimension of the shaped bakery product (P).

8. Apparatus (10) according to claim 2, in which the second shaping surface (20) is a cylindrical surface with a circular cross-section of given diameter (D2).

9. Apparatus (10) according to claim 8, in which the diameters (D1, D2) of said first and second shaping rollers (17, 19) are equal.

10. Apparatus (10) according to claim 4, in which the second shaping surface (2) is a cylindrical surface with a circular cross-section having a diameter (D2) of a magnitude of between 60% and three times the maximum transverse dimension of the shaped bakery product (P).

11. Apparatus (10) according to claim 10, in which the diameters (D1, D2) of said first and second shaping rollers (17, 19) are equal.

* * * * *

UNITED STATES PATENT AND TRADEMARK OFFICE
CERTIFICATE OF CORRECTION

PATENT NO. : 5,893,321
DATED : April 13, 1999
INVENTOR(S) : Daniele CAPETTA et al.

It is certified that error appears in the above-indentified patent and that said Letters Patent is hereby corrected as shown below:

On the title page: Item [30]    insert --Italian Patent Application MI 97 A 001179 filed May 20, 1997.-- after Priority Information.

Signed and Sealed this

Twenty-seventh Day of July, 1999

Attest:

Q. TODD DICKINSON

*Attesting Officer*    *Acting Commissioner of Patents and Trademarks*